(No Model.)

J. TESCH.
INSECT TRAP.

No. 341,290. Patented May 4, 1886.

Witnesses.
R. F. Gardner
A. W. Brecht

Inventor.
Julius Tesch,
per F. A. Lehmann,
Atty.

UNITED STATES PATENT OFFICE.

JULIUS TESCH, OF COLUMBIA, MISSOURI.

INSECT-TRAP.

SPECIFICATION forming part of Letters Patent No. 341,290, dated May 4, 1886.

Application filed March 12, 1886. Serial No. 194,937. (No model.)

*To all whom it may concern:*

Be it known that I, JULIUS TESCH, of Columbia, in the county of Boone and State of Missouri, have invented certain new and useful Improvements in Insect-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in insect-traps; and it consists in a tubular perforated body having a slit or opening in one side for the entrance of the insects, a removable cap upon one end, and a blow-tube upon the other, as will be more fully described hereinafter.

The object of my invention is to provide an insect-trap which is especially adapted to be placed in the upper portions of the window, and which is designed especially to catch flies, bees, and other such insects as they crawl up the panes of glass.

Figure 1:
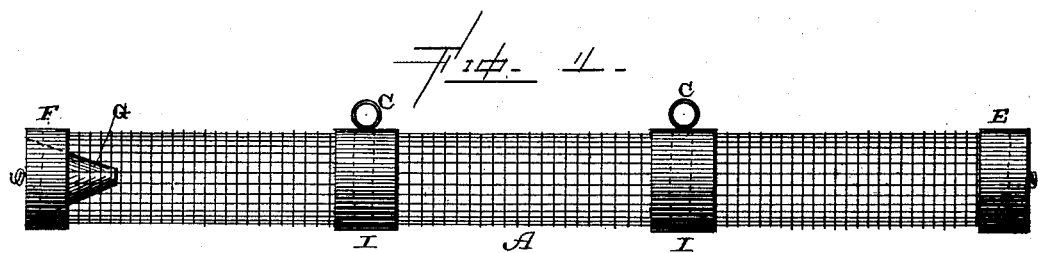
Figure 2:
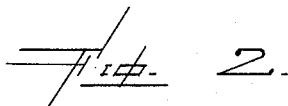
Figure 2:
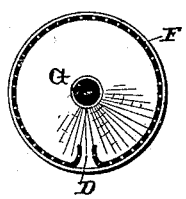

Figure 1 is a side elevation of a trap embodying my invention complete. Fig. 2 is a vertical cross-section of the same.

A represents the body of the trap, which is preferably made from wire-cloth, and which is made long enough to extend across the window in which it is to be placed. This body is preferably made rounding or tubular in shape, and where it is to be used in store or other windows of more than ordinary width the body will be composed of any suitable number of sections, which are united together by connections of any kind, and which connections are provided with suitable rings or hooks, C, upon their upper sides. As shown in Fig. 1, the body is formed of three sections, which are united together by tubular connections I. Through the lower portion of the body, and extending from end to end, is made a suitable slit or opening, D, formed by turning the edges of the body inward and upward, as shown. This slit is for the entrance of the insects into the trap, and these turned-up edges prevent the insects from making their escape from the trap after they are once caught. Upon one end of this body A is placed a cap, E, which is made removable, for the purpose of allowing the insects to be cleaned from the trap, but which closes the end of the trap while it is set. At the other end the frame is closed by the cap F, which has the blow-tube G formed as a part thereof. This tube is here shown as conical; but it may be given any other shape that may be preferred, as its only object is to enable the operator to blow the insects from the trap whenever so desired.

Where the body A is of but medium length, it may be suspended in position by means of little hooks, which are applied to opposite sides of the window-frame, and over which rings attached to the two caps will be made to catch. Where the trap is made in sections, and connections are made to unite the sections together, the trap will be supported by cords, which are fastened to the rings on the sections and to the upper portion of the window-frame.

I do not limit my invention to any particular means of suspending the trap into position in the upper portion of the frame, for this may be done in many ways without departing from the spirit of my invention.

The trap being suspended across the top of the window and in close proximity to the glass, as the insects crawl up the glass they reach the trap, and in attempting to crawl up over it pass into the slit directly into the trap. After the insects are once caught, owing to the turned-up edges on opposite sides of the slit, it is impossible for them to make their escape.

If it is desired to clean the insects out of the trap, a piece of paper or other material is wrapped around the sides of the trap, so as to prevent the air from escaping through the wire-cloth when the operator blows through the tube G, and then the cap E is removed. The operator, on blowing into the tube G, blows the insects out of the trap A into the fire or a bucket of water.

One great advantage in regard to this trap consists in that it needs no bait with which to attract the flies or bees. It has only to be hung in position, and then the insects enter it while crawling up the glass and without any attraction whatever in the trap.

Having thus described my invention, I claim—

1. In an insect-trap, a cylindrical body made of wire-cloth or other perforated material, and having a slit in its under side, in combination with a removable cap, which is placed upon one end for the purpose of emptying out the insects, substantially as shown.

2. The combination, in an insect-trap, of the body A, provided with a slit in its under side, a removable cap at one end, and a blow-tube at the other, substantially as described.

3. The combination of the perforated slitted body A, made in sections and connected together by suitable connections, which are provided with supporting-rings, a removable cap at one end, and a blow-tube at the other, substantially as set forth.

In testimony whereof I affix my signature in presence of two witnesses.

JULIUS TESCH.

Witnesses:
R. L. TODD,
JNO. S. CLARKSON.